(12) United States Patent
Mason et al.

(10) Patent No.: US 9,045,675 B2
(45) Date of Patent: Jun. 2, 2015

(54) NON-AQUEOUS, ACID SOLUBLE, HIGH-DENSITY COMPLETION FLUIDS AND PROCESS

(75) Inventors: Stephen D. Mason, Katy, TX (US); Charles Svoboda, Katy, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 546 days.

(21) Appl. No.: 13/396,243

(22) Filed: Feb. 14, 2012

(65) Prior Publication Data

US 2012/0220501 A1 Aug. 30, 2012

Related U.S. Application Data

(60) Provisional application No. 61/443,131, filed on Feb. 15, 2011.

(51) Int. Cl.
| | | |
|---|---|---|
| *C09K 8/02* | (2006.01) | |
| *C09K 8/36* | (2006.01) | |
| *C09K 8/584* | (2006.01) | |
| *C09K 8/54* | (2006.01) | |
| *E21B 43/16* | (2006.01) | |
| *E21B 37/00* | (2006.01) | |
| *C09K 8/52* | (2006.01) | |
| *C09K 8/40* | (2006.01) | |

(Continued)

(52) U.S. Cl.
CPC ... *C09K 8/52* (2013.01); *C09K 8/36* (2013.01); *C09K 8/40* (2013.01); *C09K 8/602* (2013.01); *C09K 8/64* (2013.01)

(58) Field of Classification Search
CPC ...... C09K 8/035; C09K 8/32; Y10S 507/925; Y10S 507/927
USPC ........ 507/129, 133, 246, 250; 166/305.1, 311
See application file for complete search history.

(56) References Cited

U.S. PATENT DOCUMENTS

| | | | |
|---|---|---|---|
| 4,575,428 A | 3/1986 | Clapper et al. | |
| 5,888,944 A | 3/1999 | Patel | |
| 5,905,061 A | 5/1999 | Patel et al. | |

(Continued)

FOREIGN PATENT DOCUMENTS

| | | |
|---|---|---|
| EA | 014174 B1 | 10/2010 |
| EP | 1523606 B1 | 4/2005 |

(Continued)

OTHER PUBLICATIONS

Software estimates chemical, physical properties, Chemical & Engineering News, vol. 63 (5), Feb. 4, 1985, p. 27.

(Continued)

*Primary Examiner* — Aiqun Li (57) ABSTRACT

Disclosed herein is a method comprising displacing a first oil-based fluid present in an open hole interval of a wellbore with a second fluid; and contacting the second fluid with an acidic indigenous formation fluid to produce a third fluid wherein the second fluid an aqueous fluid dispersed as a discontinuous phase within an oleaginous fluid, and an amine surfactant, wherein the amine surfactant is selected such that contacting the second fluid with indigenous fluid protonates at least a portion of the amine surfactant in the second fluid to produce the third fluid comprising an emulsion comprising the oleaginous fluid reversibly dispersed as a discontinuous phase within the aqueous fluid. A system for treating a subterranean well and a fluid are also disclosed.

17 Claims, 3 Drawing Sheets

(51) Int. Cl.
 *C09K 8/60* (2006.01)
 *C09K 8/64* (2006.01)

(56) References Cited

U.S. PATENT DOCUMENTS

| | | |
|---|---|---|
| 6,218,342 B1 | 4/2001 | Patel |
| 6,499,546 B1 | 12/2002 | Freeman et al. |
| 6,631,764 B2 | 10/2003 | Parlar et al. |
| 6,978,838 B2 | 12/2005 | Parlar et al. |
| 7,152,697 B2 | 12/2006 | Horton et al. |
| 7,331,391 B2 | 2/2008 | Keese et al. |
| 7,854,277 B2 | 12/2010 | Duncum et al. |
| 7,972,997 B2 | 7/2011 | Svoboda et al. |
| 7,998,908 B2 | 8/2011 | Rimassa et al. |
| 8,002,049 B2 | 8/2011 | Keese et al. |
| 8,006,761 B2 | 8/2011 | Duncum et al. |
| 8,105,989 B2 | 1/2012 | Svoboda et al. |
| 8,162,056 B2 | 4/2012 | Bustos et al. |
| 2001/0036905 A1 | 11/2001 | Parlar et al. |
| 2002/0033258 A1 | 3/2002 | Patel |
| 2003/0054961 A1 | 3/2003 | Taylor et al. |
| 2004/0014606 A1 | 1/2004 | Parlar et al. |
| 2004/0023817 A1 | 2/2004 | Taylor et al. |
| 2004/0147401 A1 | 7/2004 | Boy et al. |
| 2004/0147404 A1 | 7/2004 | Thaemlitz et al. |
| 2004/0176255 A1 | 9/2004 | Horton et al. |
| 2004/0259739 A1 | 12/2004 | Monfreux-Gaillard et al. |
| 2005/0155761 A1 | 7/2005 | Blauch et al. |
| 2006/0042796 A1 * | 3/2006 | Qu et al. .............. 166/279 |
| 2006/0223714 A1 | 10/2006 | Svoboda et al. |
| 2006/0223715 A1 | 10/2006 | Svoboda et al. |
| 2007/0054054 A1 | 3/2007 | Svoboda et al. |
| 2007/0056730 A1 | 3/2007 | Keese et al. |
| 2008/0110627 A1 | 5/2008 | Keese et al. |
| 2008/0139416 A1 | 6/2008 | Rimassa et al. |
| 2009/0008095 A1 | 1/2009 | Duncum et al. |
| 2010/0190664 A1 | 7/2010 | Svoboda et al. |
| 2010/0212896 A1 | 8/2010 | Navarro et al. |
| 2010/0248996 A1 | 9/2010 | Sawdon |
| 2010/0300967 A1 | 12/2010 | Dakin et al. |
| 2010/0319915 A1 | 12/2010 | Bustos et al. |
| 2010/0319919 A1 | 12/2010 | Bustos et al. |
| 2011/0056683 A1 | 3/2011 | Duncum et al. |
| 2011/0272160 A1 | 11/2011 | Arvie, Jr. et al. |

FOREIGN PATENT DOCUMENTS

| | | |
|---|---|---|
| EP | 1646702 B1 | 4/2006 |
| EP | 2075302 A1 | 7/2009 |
| EP | 2207863 B1 | 7/2010 |
| RU | 2062142 C1 | 6/1996 |
| RU | 2176261 C1 | 11/2001 |
| RU | 2359005 C2 | 6/2009 |
| WO | 0161148 A2 | 8/2001 |
| WO | 03008759 A1 | 1/2003 |
| WO | 2004469958 A1 | 8/2004 |
| WO | 2007088322 A1 | 8/2007 |
| WO | 2007147072 A1 | 12/2007 |
| WO | 2008072128 A2 | 6/2008 |
| WO | 2009006326 A2 | 1/2009 |
| WO | 2009047478 A1 | 4/2009 |
| WO | 2009073438 A2 | 6/2009 |
| WO | 2010083093 A2 | 7/2010 |
| WO | 2010129831 A2 | 11/2010 |
| WO | 2012003356 A2 | 1/2012 |

OTHER PUBLICATIONS

International Search Report and Written Opinion issued in PCT/US2012/025192 on Sep. 26, 2012; 12 pages.

Search Report issued in EP12746999.7 on Jun. 18, 2014, 13 pages.

* cited by examiner

NON-AQUEOUS, ACID SOLUBLE, HIGH-DENSITY COMPLETION FLUIDS AND PROCESS

CROSS REFERENCE TO RELATED APPLICATIONS

This application claims priority to and the benefit of provisional application U.S. 61/443,131, filed Feb. 15, 2011, which is hereby incorporated herein by reference in its entirety.

BACKGROUND

Reversible invert water-in-oil emulsion drilling fluids have been utilized heretofore for drilling well bores penetrating one or more crude oil producing zones. Such emulsion drilling fluids lubricate the drill bit and reduce the overall time required for drilling well bores. These drilling fluids are water-in-oil emulsion, wherein the water or aqueous phase is dispersed within the oil or oleaginous fluid continuous phase. Such water-in-oil emulsions employed as drilling fluids may be stabilized with nonionic amine emulsifiers and have a relatively high pH which insures that the emulsifier retains a non-ionic oil wetting character during drilling.

When a well bore has reached total depth and may have penetrated one or more oil producing zones, the water-in-oil emulsion drilling fluid is then contacted with an externally supplied acid which protonates a nonionic amine emulsifier causing it to take on a cationic charge with an increase in water solubility. By "externally supplied" it is meant that the acid or other fluid is pumped or otherwise introduced into the wellbore from the surface. The resulting protonated water soluble emulsifier has water wetting properties, and as a result, the oil and water phases in the emulsion inverts to produce an oil-in-water emulsion in the well bore. The oil-in-water emulsion may possess a lower viscosity than the water-in-oil emulsion from which it was formed.

The inverted low viscosity oil-in-water emulsion water wets the producing formations which aids in increasing oil production. In addition, the oil-in-water emulsion fluid may be easier to clean up and thus facilitates subsequent operations.

The acid utilized for contacting the water-in-oil emulsion drilling fluid and causing it to invert is generally in the form of an externally supplied aqueous acidic solution which is pumped into the well. However, such operations are known to produce aqueous acid solution-crude oil emulsions and crude oil sludging. Attempts to prevent the formation of aqueous acid solution-crude oil emulsions and crude oil sludging include the use of anionic sulfonate surfactants in the acid solution. While the anionic sulfonate surfactants function well in preventing the formation of aqueous acid-crude oil emulsions and prevent oil sludging from taking place, the anionic sulfonate surfactants may react with the amine emulsifier after it is protonated by the acid, resulting in an emulsifier which does not become water soluble and does not invert the water-in-oil emulsion into an oil-in-water emulsion. This may prevent water wetting and faster clean up, but the aqueous acid solution utilized adds to the internal water phase of the emulsion which results in the emulsion increasing in viscosity. A highly viscous water-in-oil emulsion so-formed may be difficult to remove and may cause damage to the crude oil producing zones penetrated by the well bore. In addition, the intentional addition of acid to invert the well bore represents additional cost and risk in the process.

BRIEF DESCRIPTION OF THE SEVERAL VIEWS OF THE DRAWINGS

Embodiments of the non-aqueous, acid soluble, high density completion fluid and process are described with reference to the following figures. The same numbers are used throughout the figures to reference like features and components.

SUMMARY

The present application is directed in one embodiment to a method comprising displacing a first oil-based fluid present in an open hole interval of a wellbore with a second fluid; and contacting the second fluid with an indigenous formation fluid for a period of time sufficient to produce a third fluid from at least a portion of the second fluid, wherein the second fluid comprises a reversible invert emulsion comprising an aqueous fluid reversibly dispersed as a discontinuous phase within an oleaginous fluid, and an amine surfactant, wherein the amine surfactant is selected such that contacting the second fluid with the indigenous formation fluid for the sufficient period of time protonates at least a portion of the amine surfactant in the second fluid to produce the third fluid comprising an emulsion comprising the oleaginous fluid dispersed as a discontinuous phase within the aqueous fluid, wherein at least 40 vol % of the non-proppant solids present in the second fluid are water-soluble at an acidic pH, or a pH of less than or equal to 6.5.

The present application is further directed in another embodiment to a fluid comprising a reversible invert emulsion comprising an aqueous fluid reversibly dispersed as a discontinuous phase within an oleaginous fluid, and an amine surfactant, wherein the amine surfactant is selected such that contacting the fluid with an indigenous formation fluid for a sufficient period of time protonates at least a portion of the amine surfactant in the fluid to produce a second fluid comprising an emulsion comprising the oleaginous fluid dispersed as a discontinuous phase within the aqueous fluid, wherein at least 40 vol % of the non-proppant solids present in the fluid are water-soluble at an acidic pH, or a pH of less than or equal to 6.5, wherein the amine surfactant has the structure:

wherein $R^1$ is a $C_8$-$C_{24}$ hydrocarbyl;

wherein $R^2$ and $R^3$ are independently selected from $C_2$-$C_{10}$ substituted or unsubstituted hydrocarbyl, ethylene oxide, propylene oxide, or a combination thereof; and wherein a+b is greater than or equal to 2.

In a further embodiment, the invention provides a treatment fluid comprising a reversible invert emulsion comprising an aqueous fluid reversibly dispersed as a discontinuous phase within an oleaginous fluid, and an amine surfactant, wherein the amine surfactant is selected such that contacting the treatment fluid with an acid supplied at least partially by an indigenous formation fluid for the sufficient period of time protonates at least a portion of the amine surfactant to produce an emulsion comprising the oleaginous fluid dispersed as a discontinuous phase within the aqueous fluid, wherein the treatment fluid comprises a density of at least 13.5 pounds (mass) per gallon (lbm/gal) and at least 40 vol % of any solids present in the treatment fluid are water-soluble at an acidic pH, or a pH of less than or equal to 6.5.

In a further embodiment, the invention provides a method comprising drilling an open hole interval of a wellbore with a reversible invert emulsion drilling fluid; and contacting the invert emulsion drilling fluid with an indigenous formation fluid for a period of time sufficient to produce a water-external phase emulsion from at least a portion of the drilling fluid, wherein the drilling fluid comprises an invert emulsion comprising an aqueous fluid reversibly dispersed as a discontinuous phase within an oleaginous fluid, and an amine surfactant, wherein the amine surfactant is selected such that contacting the drilling fluid with the indigenous formation fluid for the sufficient period of time protonates at least a portion of the amine surfactant in the drilling fluid to produce the water-external phase emulsion comprising the oleaginous fluid dispersed as a discontinuous phase within the aqueous fluid, wherein the drilling fluid comprises a density of at least 13.5 lbm/gal and at least 40 vol % of any solids present in the drilling fluid are water-soluble at an acidic pH, or a pH of less than or equal to 6.5.

This summary is provided to introduce a selection of concepts that are further described below in the detailed description. This summary is not intended to identify key or essential features of the claimed subject matter, nor is it intended to be used as an aid in limiting the scope of the claimed subject matter.

DETAILED DESCRIPTION

At the outset, it should be noted that in the development of any such actual embodiment, numerous implementation-specific decisions are made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. Also, in the summary and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

As used in the specification and claims, "near" is inclusive of "at."

The following definitions are provided in order to aid those skilled in the art in understanding the detailed description.

The term "treatment", or "treating", refers to any subterranean operation that uses a fluid in conjunction with a desired function and/or for a desired purpose. The term "treatment", or "treating", does not imply any particular action by the fluid.

The term "fracturing" refers to the process and methods of breaking down a geological formation and creating a fracture, i.e. the rock formation around a well bore, by pumping fluid at very high pressures (pressure above the determined closure pressure of the formation), in order to increase production rates from a hydrocarbon reservoir. The fracturing methods otherwise use conventional techniques known in the art.

As used herein, the new numbering scheme for the Periodic Table Groups are used as in Chemical and Engineering News, 63(5), 27 (1985).

As used herein, the term "liquid composition" or "liquid medium" refers to a material which is liquid under the conditions of use. For example, a liquid medium may refer to water, and/or an organic solvent which is above the freezing point and below the boiling point of the material at a particular pressure. A liquid medium may also refer to a supercritical fluid.

The term "non-proppant solids" as used herein refers to solids, which may include various weighting agents, but which do not include proppants which remain insoluble to function. Examples of proppant solids include gravel packing solids, sand, and the like.

Well bores have heretofore been drilled into one or more crude oil producing zones using invertible water-in-oil emulsion drilling fluids stabilized with high pH nonionic emulsifiers. When the well bore reaches total depth, the water-in-oil emulsion is contacted with an aqueous acid solution to invert the emulsion, i.e., to form a lower viscosity oil-in-water emulsion which water wets the formation surfaces in the well bore and facilitates the cleanup of the well bore. In an embodiment, a method comprises displacing a first oil-based fluid present in an open hole interval of a wellbore with a second fluid; and contacting the second fluid with an indigenous formation fluid for a period of time sufficient to produce a third fluid from at least a portion of the second fluid, wherein the second fluid comprises a reversible invert emulsion comprising an aqueous fluid dispersed as a discontinuous phase within an oleaginous fluid, and an amine surfactant, wherein the amine surfactant is selected such that contacting the second fluid with the indigenous formation fluid for the sufficient period of time protonates at least a portion of the amine surfactant in the second fluid to produce the third fluid comprising an emulsion comprising the oleaginous fluid dispersed as a discontinuous phase within the aqueous fluid, wherein at least 40 vol % of the non-proppant solids present in the second fluid are water-soluble at an acidic pH, or a pH of less than or equal to 6.5.

Figure 1:
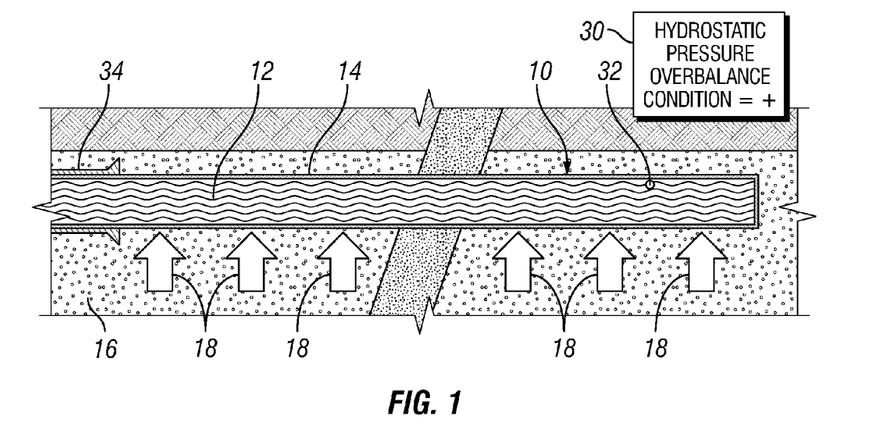
FIG. 1 illustrates a wellbore following drilling and prior to completion according to an embodiment of the instant disclosure.

FIG. 1 shows an openhole wellbore 10 following drilling prior to completion according to an embodiment of the instant disclosure. As shown in FIG. 1, the open hole interval of the wellbore 10 is located below an upper cased hole interval 34 of the wellbore 10, but may also be located in an upper open hole interval of the wellbore, or a combination thereof. The openhole wellbore 10 contains an oil-based fluid 12. A filter cake 14 is deposited on the face of the openhole wellbore 10. In an embodiment, the first oil based fluid 12 may be circulated for a period of time sufficient to remove at least a portion of any drilling debris 32 present in the wellbore prior to displacing the first oil based fluid 12.

The formation 16 comprises an indigenous fluid 18 comprising carbon dioxide, hydrogen sulfide, and/or the like such that the pH of the indigenous fluid is less than or equal to about 6.5. The hydrostatic pressure overbalance 30 may be positive (represented by a "+" in the figure), to prevent indigenous fluid 18 from flowing into the open hole wellbore 10.

Figure 2:
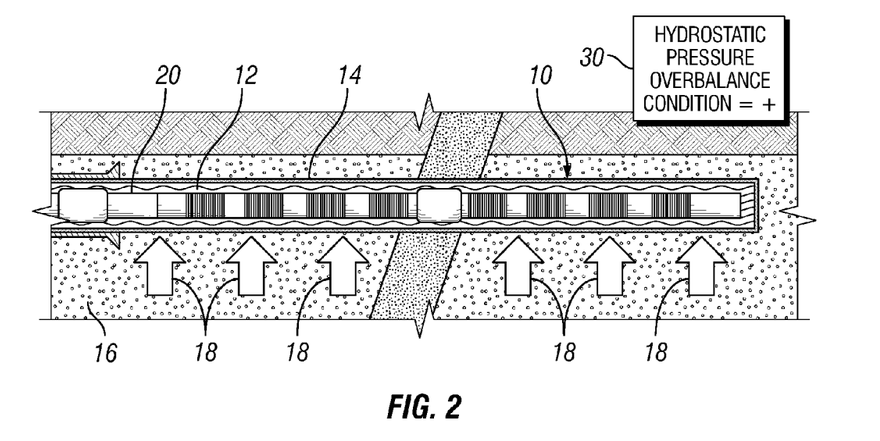
FIG. 2 illustrates a completion equipment string installed into a wellbore according to an embodiment of the instant disclosure.

In the embodiment shown in FIG. 2, a completion equipment string 20 is installed and/or located into the openhole wellbore 10 in the presence of the oil based drilling fluid 12. In an alternative embodiment, the completion equipment string 20 may be installed and/or located into the openhole wellbore 10 after displacement of the oil based drilling fluid 12, also referred to herein as the first fluid, by a second fluid comprising a reversible invert emulsion comprising an aqueous fluid dispersed as a discontinuous phase within an oleaginous fluid, and an amine surfactant, wherein the amine surfactant is selected such that contacting the second fluid with the indigenous formation fluid 18 for the sufficient period of time protonates at least a portion of the amine surfactant in the second fluid to produce the third fluid comprising an emulsion comprising the oleaginous fluid dispersed as a discontinuous phase within the aqueous fluid, wherein at least 40 vol % of the non-proppant solids present in the second fluid are water-soluble at a pH of less than or equal to 6.5. The hydrostatic pressure overbalance 30 may be positive (represented by a "+" in the figure), to prevent indigenous fluid 18 from flowing into the open hole wellbore 10.

Figure 3:
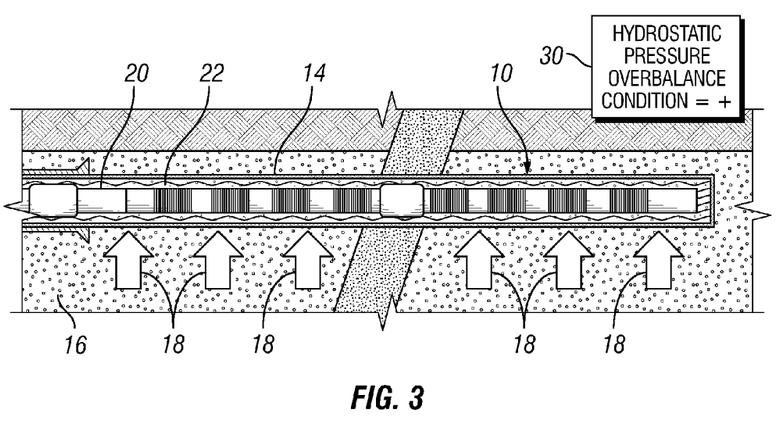
FIG. 3 illustrates a reversible invert emulsion fluid displacing oil-based fluid in wellbore according to an embodiment of the instant disclosure.

As shown in FIG. 3, the first oil based fluid 12 is replaced with a second fluid 22 comprising a reversible invert emulsion comprising an aqueous fluid dispersed as a discontinuous phase within an oleaginous fluid, and an amine surfactant, wherein the amine surfactant is selected such that contacting the second fluid with the indigenous formation fluid 18 for the sufficient period of time protonates at least a portion of the amine surfactant in the second fluid 22 to produce the third fluid (See FIG. 5) comprising an emulsion comprising the oleaginous fluid dispersed as a discontinuous phase within the aqueous fluid, wherein at least 40 vol % of the non-proppant solids present in the second fluid 22 are water-soluble at a pH of less than or equal to 6.5. Filter cake 14 may still be present on the surface of formation 16. In an alternative embodiment, filter cake 14 may be the result of deposition from second fluid 22. The hydrostatic pressure overbalance 30 may be positive (represented by a "+" in the figure), to prevent indigenous fluid 18 from flowing into the open hole wellbore 10.

Figure 4:
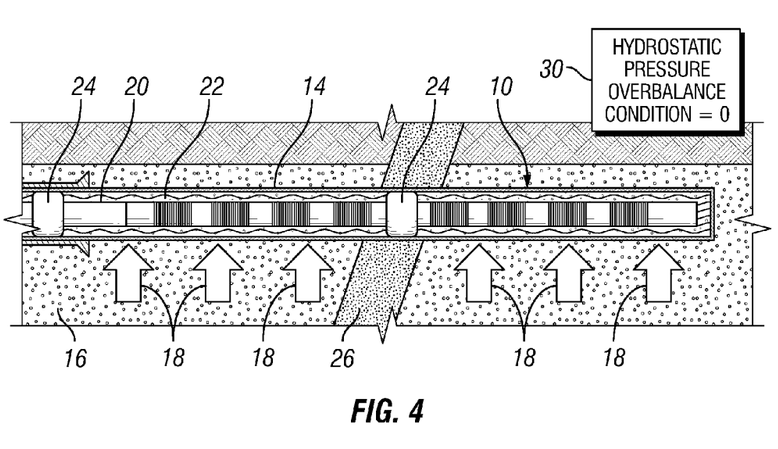
FIG. 4 illustrates setting of completion equipment string in wellbore according to an embodiment of the instant disclosure.

FIG. 4 shows setting of completion equipment string 20 in an interval of open hole wellbore 10 according to an embodiment of the instant disclosure. As shown in FIG. 4, completion packers 24 may be located to trap the second fluid 22 in the annulus in contact with the filtercake 14. As is also shown in FIG. 4, completion packers 24 may be located in a low permeability formation and/or a compartmental barrier 26 which may be present in a particular openhole wellbore 10. The hydrostatic pressure overbalance 30 may be neutral or balanced (represented by a "0" in the figure), to prevent indigenous fluid 18 from flowing into the open hole wellbore 10, and to prevent filter cake 14 from further penetrating formation 16.

Figure 5:
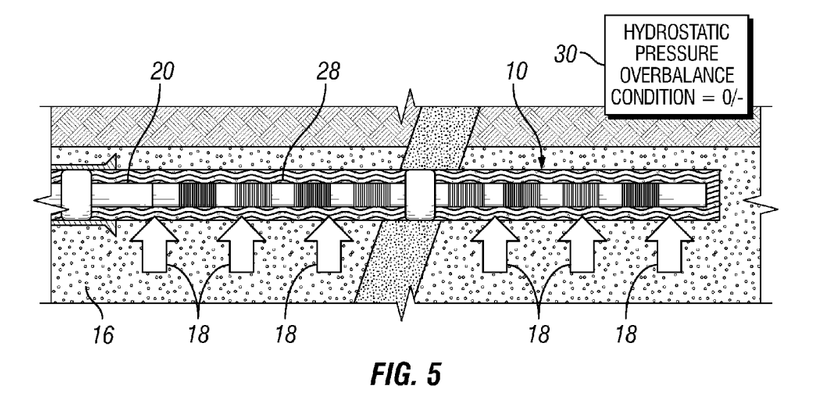
FIG. 5 illustrates contacting of the reversible invert emulsion water in oil fluid with indigenous formation fluid to produce oil in water emulsion according to an embodiment of the instant disclosure.

FIG. 5 shows contacting of invert emulsion water in oil second fluid 22 with acidic indigenous formation fluid 18 by diffusion to produce an oil in water emulsion, referred to as a third fluid 28 within open hole wellbore 10 according to an embodiment of the instant disclosure. The phase reversal is accomplished by diffusion of acidic fluids from the formation (indigenous formation fluid 18) into the second fluid 22 to produce an oil in water emulsion. In doing so, the third fluid 28 becomes water wetting, and thus facilitates the removal of the filter cake 14 formally present on the surface of formation 16. The well may then be further acid stimulated or the like. The hydrostatic pressure overbalance 30 may be neutral or balanced to negative (represented by a "0/−" in the figure), to allow indigenous fluid 18 to flow into the open hole wellbore 10, driven by diffusion and/or pressure gradient.

Figure 6:
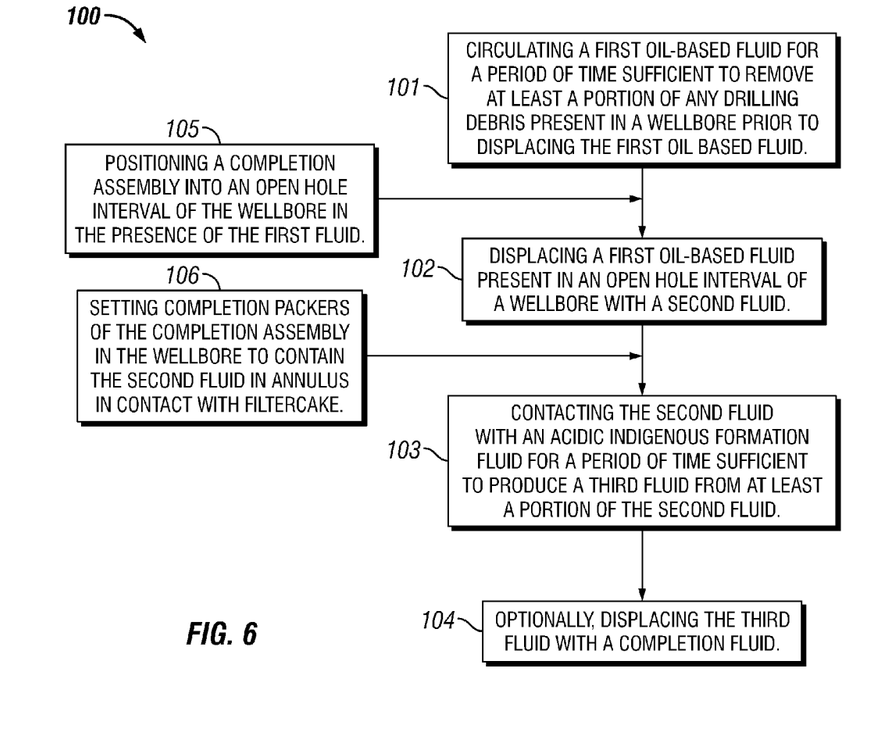
FIG. 6 illustrates a flowchart of a method according to an embodiment of the instant disclosure.

As illustrated in FIG. 6, according to an embodiment, a method (100) may comprise displacing a first oil-based fluid present in an open hole interval of a wellbore with a second fluid (102). The method may optionally include circulating a first oil-based fluid for a period of time sufficient to remove at least a portion of any drilling debris or filtercake present in a wellbore prior to displacing the first oil based fluid (101). The method may optionally include positioning a completion assembly into an open hole interval of the wellbore in the presence of the first fluid (105). The method may further include setting completion packers of the completion assembly in the wellbore to contain the second fluid in annulus in contact with filtercake (106). The method may further include contacting the second fluid with an acidic indigenous formation fluid for a period of time sufficient to produce a third fluid from at least a portion of the second fluid (103). The method may optionally include displacing the third fluid with a completion fluid (104), and/or other completion activities as known in the art.

In an embodiment, an interval may be first drilled with a conventional oil based drilling fluid, e.g., an oil based barite weighted drilling fluid, an oil-base mud, or the like, as the first fluid. Prior to positioning a lower completion assembly into the well, the conventional first fluid may first be circulated at a rate effective to remove at least a portion of the drilling debris present, e.g., by flushing or eroding all or a portion of the filter cake in the completion zone, for example, to ensure thinning of the thickness of the conventional mud filtercake, such as for example the maximum thinning achievable by drilling mud circulation. Accordingly, in an embodiment, the method may further comprise circulating the first oil-based fluid for a period of time sufficient to remove at least a portion of any drilling debris and/or filtercake present in the wellbore prior to displacing the first oil based fluid.

In an embodiment, the openhole interval of the wellbore may be located below an upper cased hole interval of the wellbore, an upper open hole interval of the wellbore, or a combination thereof.

In an embodiment, the conventional oil based drilling first fluid present in the openhole interval may then be at least partially displaced with a second oil-based fluid comprising a water-in-oil emulsion system, which may be a reversible water-in-oil emulsion system, which inhibits the re-accumulation of acid insoluble filtercake and facilitates a condition wherein the annular spaces located therein contain a reduced amount of acid insoluble materials. In an embodiment, the second fluid is compatible with the existing first fluid and/or any completion or other fluids that follow in a sequence. In an embodiment, the second oil-based fluid comprises less than or equal to about 60 vol %, or less than or equal to about 50 vol %, or less than or equal to about 40 vol %, or less than or equal to about 30 vol %, or less than or equal to about 20 vol %, or less than or equal to about 10 vol %, or less than or equal to about 5 vol %, or less than or equal to about 1 vol %, or less than or equal to about 0.1 vol % of non-proppant solids which are non-acid soluble. For purposes herein, a solid which is non-acid soluble refers to a solid which is 99.9 wt % or more insoluble in an acidic aqueous solution, or a solid in which less than about 0.1 wt % is soluble in a aqueous solution having a pH of less than or equal to 6.5, or having a pH of less than or equal to about 6. In an embodiment, the second oil-based fluid comprises less than or equal to about 0.1 wt % barium sulfate, also referred to in the art as barite.

In an embodiment, once a well bore is treated such that the first fluid is at least partially displaced with the second fluid, the treated well bore interval may comprise a clean purpose built acid soluble reversible emulsion non-aqueous fluid system in the openhole interval and optionally a conventional non-aqueous fluid in another portion of the wellbore, for example a cased portion of the wellbore located above the interval of interest.

In an embodiment, the second fluid located in the interval of interest, is of equivalent or higher density as compared with the first fluid previously displaced by the second fluid, and/or is chemically and/or physically compatible with the first fluid. In an embodiment, the second fluid is tolerant of the conditions of pressure and temperature and the presence of $H_2S$ and/or $CO_2$ present in the well bore for a limited period of time. In an embodiment, less than 50 wt % of the second fluid present in a well bore in the presence of the indigenous fluid does not invert into an oil-in-water emulsion, also referred to herein as the third fluid, in a period of time less than the sufficient period of time required to protonate at least a portion of the amine surfactant in the second fluid to produce the third fluid comprising an emulsion comprising the oleaginous fluid reversibly dispersed as a discontinuous phase within the aqueous fluid. In an embodiment, the amine surfactant, the concentration of the amine surfactant, a buffer system present in the second fluid, or a combination thereof is selected such that less than 50 wt % of the second fluid present in a well bore in contact with an acidic indigenous fluid inverts into an oil-in-water emulsion in 12 hours or less, or in 24 hours or less, or in 48 hours or less.

In an embodiment, a completion assembly may be positioned into the open hole interval in the presence of the first fluid, the second fluid, or the third fluid. In an embodiment, the completion assembly is positioned into the open hole interval in the presence of the first fluid, or in the presence of the second fluid when the second fluid is used to drill the well and the first fluid is not used. In an embodiment, once the second fluid is in place, initial completion operations may then be undertaken including setting of one or more primary lower completion isolation packers, which include mechanical isolation packers, and the like trapping or otherwise containing the second fluid in the annulus in contact with the filtercake.

In an embodiment, the method includes displacing a first fluid with a second fluid located in a horizontal or a highly deviated well, which may then be gravel packed according to methods known in the art. In an embodiment, the first fluid is not utilized and the second fluid according to the instant disclosure is used to produce the filter cake and is also used in combination with the gravel packer fluid, wherein the second fluid comprises a reversible invert emulsion comprising an aqueous fluid dispersed as a discontinuous phase within an oleaginous fluid, and an amine surfactant, wherein the amine surfactant is selected such that contacting the second fluid with the acidic indigenous formation fluid for the sufficient period of time protonates at least a portion of the amine surfactant in the second fluid to produce the third fluid comprising an emulsion comprising the oleaginous fluid reversibly dispersed as a discontinuous phase within the aqueous fluid, wherein at least 40 vol % of any non-proppant solids present in the second fluid are water-soluble at a pH of less than or equal to 6.5.

In an embodiment, the second fluid may then be left in place within the annulus between any installed completion hardware and the openhole. In an embodiment, the second fluid may be in place when a sand screen or other form of completion hardware is positioned in the wellbore prior to or after gravel packing. In an embodiment, gravel packing may be accomplished in the presence of the second fluid utilizing a compatible carrier fluid comprising the packing material as is known in the art. In an embodiment, gravel packing may be accomplished after the second fluid is contacted with the indigenous formation fluid for a period of time sufficient to produce a third fluid from at least a portion of the second fluid, wherein the second fluid comprises a reversible invert emulsion comprising an aqueous fluid reversibly dispersed as a discontinuous phase within an oleaginous fluid, and an amine surfactant, wherein the amine surfactant is selected such that contacting the second fluid with the indigenous formation fluid for the sufficient period of time protonates at least a portion of the amine surfactant in the second fluid to produce the third fluid comprising an emulsion comprising the oleaginous fluid reversibly dispersed as a discontinuous phase within the aqueous fluid, wherein at least 40 vol % of the non-proppant solids present in the second fluid are water-soluble at an acidic pH, or a pH of less than or equal to 6.5.

In an embodiment, at least a portion of the second fluid may be displaced within the lower completion annulus by still another second fluid having an even lower solids content and/or a lower density than the initial second fluid prior to or after any form of completion hardware is positioned in the wellbore. Such an alternative second fluid may be utilized depending on the conditions dictated by the resultant acceptable differential pressure created by the fluid columns during pumping operations, and/or other concerns as readily understood by one of skill in the art.

In an embodiment, any upper cased hole interval present in the well bore may then be displaced from a conventional non-aqueous fluid to a clean brine-based completion fluid of requisite density, using techniques readily known in the art.

In an embodiment, following any installation of completion hardware, various intervals of the well bore comprising the second fluid may then be stimulated by contacting the second fluid with an indigenous formation fluid present in the wellbore for the sufficient period of time to produce a third fluid comprising an emulsion comprising the oleaginous fluid of the second fluid reversibly dispersed as a discontinuous phase within the aqueous fluid of the second fluid in combination with the indigenous fluid.

Accordingly, in an embodiment, at least a portion of the second fluid is acidified via the indigenous fluid present in the well bore to convert the water-in-oil emulsion into a third fluid comprising an oil-in-water emulsion. In an embodiment, the third fluid has a lower viscosity than the second fluid. In an embodiment, a viscosity of the second fluid is higher than a viscosity of the third fluid.

In an embodiment, the second fluid comprises a reversible invert emulsion comprising an aqueous fluid reversibly dispersed as a discontinuous phase within an oleaginous fluid, and an amine surfactant, wherein the amine surfactant is selected such that contacting the second fluid with the indigenous formation fluid present in the wellbore for the sufficient period of time protonates at least a portion of the amine surfactant in the second fluid to produce the third fluid comprising an emulsion comprising the oleaginous fluid reversibly dispersed as a discontinuous phase within the aqueous fluid. In an embodiment, at least 40 vol % of the non-proppant solids present in the second fluid are water-soluble at an acidic pH, or a pH of less than or equal to 6.5. In an embodiment, the second fluid comprises a buffer system selected to comprise a buffering capacity such that contacting the second fluid with the indigenous formation fluid present in the wellbore for the sufficient period of time protonates at least a portion of the amine surfactant in the second fluid to produce the third fluid. In an embodiment, the amine surfactant is a component of the buffer system. In an embodiment, the amine surfactant is the base and the protonated form of the amine surfactant is the conjugate acid of the buffer system. In an embodiment, the buffer system comprises an additional acid with a corresponding conjugate base, and/or an additional base with a corresponding conjugate acid other than, in addition to, the selected amine surfactant.

In an embodiment, an interval may be chemically stimulated by contacting the second fluid with an indigenous formation fluid for a period of time sufficient to produce a third fluid from at least a portion of the second fluid alone, or in combination with other external stimulation activities including providing an external stimulation fluid, e.g., providing an acidic solution, to the interval of the wellbore. In an embodiment, an appropriate external stimulation fluid may be provided to an interval by dropping a ball or otherwise opening a selected interval and pumping the stimulation treatment fluid into the zone, and the like. In an embodiment, the externally supplied stimulation fluid may be an aqueous acid solution. In an embodiment, the acid in the aqueous acid solution can be selected from inorganic acids, such as hydrochloric acid, or from organic acids, such as acetic, formic, glycolic acid or combinations thereof. In an embodiment, the externally supplied acid is hydrochloric acid and is supplied to the interval as an aqueous acid solution having from about 1% to about 36% by weight of HCl in the solution, or from 10% to about 15% HCl by weight.

In an embodiment, stimulation treatment of the second fluid results in emulsion reversal to produce the third fluid, which in-turn results in filtercake breakdown and dissolution of residual acid soluble solids present in the annulus of the wellbore in the interval being stimulated. The instant method contributes to operational time savings and improves potential future stimulation results without requiring additional and problematic future displacements.

In an embodiment, the method may comprise positioning a completion assembly into the open hole interval in the presence of the third fluid, i.e., after stimulation. In an embodiment, the method may further comprise displacing at least a portion of the third fluid with at least one other completion fluid. In an embodiment, the method may further comprise displacing an oil based fluid located above the open hole interval of the wellbore with a completion fluid.

In an embodiment, the first fluid comprises an oleaginous fluid which is the same as the oleaginous fluid present in the second fluid. In an embodiment, a sufficient period of time of contact between the second fluid and the indigenous formation fluid required to stimulate the well to produce the third fluid is defined as the time required to convert greater than 50 wt % of the second fluid into the third fluid under conditions present in the well, or under simulated conditions representative of the well environment. In an embodiment, a sufficient period of time of contact between the second fluid and the indigenous formation fluid required to stimulate the well to produce the third fluid is at least 12 hours, or at least 24 hours, or at least 48 hours. In an embodiment, a sufficient period of time of contact between the second fluid and the indigenous formation fluid required to protonate at least a portion of the amine surfactant, or at least 50 wt % of the amine surfactant, present in the second fluid to produce the third fluid from at least a portion of the second fluid, or at least 50 wt % of the second fluid, is at least 12 hours, or at least 24 hours, or at least 48 hours.

In an embodiment, the contacting between the water in oil emulsion and the indigenous fluid present in the well to produce the oil in water emulsion does not include physical input, but is a passive process or a diffusion process wherein the water in oil emulsion (e.g., the second fluid) is allowed to contact the indigenous fluid present in the well without further mechanical or energy input. In an embodiment, the contact of the water in oil emulsion (e.g., the second fluid) is accomplished by shutting in at least a portion of the well for a period of time sufficient to convert at least 50 wt % of the fluid comprising the water in oil emulsion (e.g., the second fluid) into the fluid comprising an oil in water emulsion (e.g., the third fluid). In an embodiment, at least a portion of the well is shut in for greater than or equal to about 12 hours, or greater than or equal to about 24 hours, or greater than or equal to about 48 hours, or greater than or equal to about 100 hours, or greater than or equal to about 500 hours.

In an embodiment, the indigenous formation fluid has an acid pH. In an embodiment, the indigenous fluid comprises dissolved carbon dioxide as carbonic acid, hydrogen sulfide, or a combination thereof.

In an embodiment, the second fluid comprises an amine surfactant having the structure:

wherein $R^1$ is a $C_8$-$C_{24}$ hydrocarbyl;
wherein $R^2$ and $R^3$ are independently selected from $C_2$-$C_{10}$ substituted or unsubstituted hydrocarbyl, ethylene oxide, propylene oxide, or a combination thereof; and wherein a+b is greater than or equal to 2. In an embodiment, the amine surfactant comprises from about 2 to about 30 moles of ethylene oxide, propylene oxide, or a combination thereof.

As used herein, the term hydrocarbyl includes $C_{1-20}$ straight, branched and cyclic alkyl radicals, $C_{6-20}$ aromatic radicals, $C_{7-20}$ alkyl-substituted aromatic radicals, $C_{7-20}$ aryl-substituted alkyl radicals, halogenated radicals, various hydrocarbyl substituents, and the like. In addition two or more such radicals may together form a fused ring system, including partially or fully hydrogenated fused ring systems, or they may form a metallocycle with a metal. Suitable hydrocarbyl-substituted radicals include mono-, di- and tri-substituted functional groups, also referred to herein as radicals, comprising a Group 14 element, wherein each of the hydrocarbyl groups contains from 1 to 20 carbon atoms. Examples of the various hydrocarbyl substituents include substituents comprising Group 15 and/or Group 16 heteroatoms. Other functional groups suitable for use as substituents include organic and inorganic radicals, wherein each of the functional groups comprises hydrogen, and atoms from Groups 13, 14, 15, 16, and/or 17, or 1 to 20 carbon atoms, oxygen, sulfur, phosphorous, silicon, selenium, or a combination thereof. In addition, functional groups may include one or more functional group substituted with one or more additional functional groups. Examples of functional groups included in the term hydrocarbyl include amines, phosphines, ethers, esters, thioethers, alcohols, amides, and/or derivatives thereof.

In an embodiment, the amine surfactant comprises an ethoxylated tallow amine; soya amine; N-alkyl-1,3-diaminopropane, wherein the alkyl is a $C_{12}$ to $C_{22}$ hydrocarbon; or a combination thereof. In an embodiment, the amine surfactant comprises from about 2 to about 30 moles of ethylene oxide, propylene oxide, or a combination thereof. In an embodiment, the amine surfactant comprises from 2 to 30 moles of ethylene oxide.

As used herein, a high density fluid has a density of greater than or equal to about 13 lbm/gal. Suitable examples include FAZEPRO™ (M-I SWACO, Houston, Tex.) which is a reversible oil-based emulsion drilling fluid. In an embodiment, the second fluid is prepared with a minimum amount of barite or other acid insoluble weighting agents. In an embodiment, the second fluid comprises less than or equal to about 60 vol %, or less than or equal to about 50 vol %, or less than or equal to about 40 vol %, or less than or equal to about 30 vol %, or less than or equal to about 20 vol %, or less than or equal to about 10 vol %, or less than or equal to about 5 vol %, or less than or equal to about 1 vol %, or less than or equal to about 0.1 vol % of barite or other acid insoluble weighting agents.

In an embodiment, the second fluid comprises a reversible emulsion system having a density of greater than or equal to about 13 lbm/gal, or greater than or equal to about 13.5 lbm/gal, or greater than or equal to about 14 lbm/gal, or greater than or equal to about 14.5 lbm/gal, or greater than or equal to about 15 lbm/gal, or greater than or equal to about 15.5 lbm/gal., and/or at least 40 vol %, or at least 50 vol %, or at least 60 vol %, or at least 70 vol %, or at least 80 vol %, or at least 90 vol %, or at least 95 vol %, or at least 99 vol % of the non-proppant solids present in the second fluid, based on the total weight of the non-proppant solids present in the fluid, are water-soluble at an acidic pH or a pH of less than or equal to 6.5, or less than or equal to 6.0, or from about 4.0 to about 6.5, or from about 5 to about 6.

In an embodiment, the second fluid comprises from about 30% to about 70% by volume of an oleaginous fluid. In an embodiment, the oleaginous fluid is selected from a group consisting of diesel oil, mineral oil, a synthetic oil, and combinations thereof. In an embodiment, the second fluid comprises from about 30% to about 70% of the aqueous fluid. In an embodiment, the aqueous fluid is water, sea water, a brine comprising organic or inorganic dissolved salts, or a combination thereof.

In an embodiment, the second fluid comprises from about 0.1 to about 20 wt % of the amine surfactant or a combination of amine surfactants. In an embodiment, the second fluid comprises about 0.5 to about 15 wt %, or about 1 to about 10 wt %, or about 2 to about 5 wt % of the amine surfactant.

In an embodiment, the second fluid comprises one or more buffer systems. Suitable buffer systems include buffer systems comprising triethanolamine, sodium hydroxide, sodium acetate, sodium bicarbonate, calcium hydroxide, calcium acetate, and/or calcium carbonate. Other examples of suitable buffer systems include carbonic acid/potassium carbonate, phosphoric acid/potassium or sodium phosphate, acetic acid/sodium acetate. In an embodiment, the buffer system includes, without limitation: phosphate buffers; sulfate buffers; acetic/acetate buffers; $C_1$ to $C_{10}$ mono- and polycarboxylic acid buffers; substituted carboxylic acids such as lactic, ascorbic, and tartaric acid buffers; and carboxylic acids that have unsaturation such as maleic and fumaric buffers, and the like. The second fluid may thus comprise any buffer system known to those skilled in the art. In an embodiment, the buffer and/or the concentration of the buffer may be selected according to the indigenous fluid present in a particular well bore, and/or according to the desired sufficient period of time required to protonate at least a portion of the amine surfactant in the second fluid to produce the third fluid comprising an emulsion comprising the oleaginous fluid reversibly dispersed as a discontinuous phase within the aqueous fluid.

In an embodiment, a system for treating a subterranean well comprises a first fluid comprising a reversible invert emulsion comprising an aqueous fluid reversibly dispersed as a discontinuous phase within an oleaginous fluid, and an amine surfactant, wherein the amine surfactant is selected such that contacting the first fluid with the indigenous formation fluid for the sufficient period of time protonates at least a portion of the amine surfactant in the first fluid to produce a second fluid comprising an emulsion comprising the oleaginous fluid reversibly dispersed as a discontinuous phase within the aqueous fluid, wherein at least 40 vol % of the non-proppant solids present in the first fluid are water-soluble at an acidic pH, or a pH of less than or equal to 6.5.

In an embodiment the system for treating a subterranean well comprises an amine surfactant having the structure:

wherein $R^1$ is a $C_8$-$C_{24}$ hydrocarbyl;
wherein $R^2$ and $R^3$ are independently selected from $C_2$-$C_{10}$ substituted or unsubstituted hydrocarbyl, ethylene oxide, propylene oxide, or a combination thereof; and wherein a+b is greater than or equal to 2. In an embodiment, the amine surfactant comprises from about 2 to about 30 moles of ethylene oxide, propylene oxide, or a combination thereof. In an embodiment, the amine surfactant comprises from 2 to 30 moles of ethylene oxide.

In an embodiment, a fluid comprises a reversible invert emulsion comprising an aqueous fluid reversibly dispersed as a discontinuous phase within an oleaginous fluid, and an amine surfactant, wherein the amine surfactant is selected such that contacting the fluid with an indigenous formation fluid for a sufficient period of time protonates at least a portion of the amine surfactant in the fluid to produce a second fluid comprising an emulsion comprising the oleaginous fluid reversibly dispersed as a discontinuous phase within the aqueous fluid, wherein at least 40 vol % of the non-proppant solids present in the fluid are water-soluble at an acidic pH, or a pH of less than or equal to 6.5, wherein the amine surfactant has the structure:

wherein $R^1$ is a $C_8$-$C_{24}$ hydrocarbyl;
wherein $R^2$ and $R^3$ are independently selected from $C_2$-$C_{10}$ substituted or unsubstituted hydrocarbyl, ethylene oxide, propylene oxide, or a combination thereof; and wherein a+b is greater than or equal to 2. In an embodiment, the amine surfactant comprises from about 2 to about 30 moles of ethylene oxide, propylene oxide, or a combination thereof. In an embodiment, the amine surfactant comprises from 2 to 30 moles of ethylene oxide.

In an alternative embodiment, a production interval of a well bore may be drilled using the heretofore referred to second fluid, which comprises a relatively high density non-aqueous fluid prepared in such a manner that commercial additives including weighting agents are acid soluble. Accordingly, in an embodiment, a oil-based drilling fluid which does not comprise an invertible emulsion, or which comprises greater than 40 vol %, or greater than 50 vol %, or greater than 60 vol %, or greater than 80 vol % of solids which are not soluble in an acidic aqueous solution is not utilized and thus, cannot be replaced by the heretofore referred to second fluid. For purposes of clarity, in this alternative embodiment, the heretofore referred to second fluid which is used in the absence of a conventional oil based drilling fluid is referred to as a first acid soluble invert emulsion fluid and the heretofore referred to third fluid is referred to as a second oil in water emulsion acid soluble fluid.

In an embodiment, a system for treating a subterranean well comprises a first acid soluble invert emulsion fluid comprising a reversible invert emulsion comprising an aqueous fluid reversibly dispersed as a discontinuous phase within an oleaginous fluid, and an amine surfactant, wherein the amine surfactant is selected such that contacting the first fluid with the indigenous formation fluid for the sufficient period of time protonates at least a portion of the amine surfactant in the first acid soluble invert emulsion fluid to produce a second oil in water emulsion acid soluble fluid comprising an emulsion comprising the oleaginous fluid reversibly dispersed as a discontinuous phase within the aqueous fluid, wherein at least 40 vol % of the non-proppant solids present in the first acid soluble invert emulsion fluid are water-soluble at an acidic pH, or a pH of less than or equal to 6.5.

In an embodiment, the oleaginous fluid may comprise diesel oil, kerosene, paraffinic oil, crude oil, LPG, toluene, xylene, ether, ester, mineral oil, biodiesel, vegetable oil, animal oil, acetone, acetonitrile, benzene, 1-butanol, 2-butanol, 2-butanone, t-butyl alcohol, carbon tetrachloride, chlorobenzene, chloroform, cyclohexane, 1,2-dichloroethane, diethyl ether, diethylene glycol, diglyme (diethylene glycol dimethyl ether), 1,2-dimethoxyethane (glyme, DME), dimethylether, dibuthylether, dimethyl-formamide (DMF), dimethyl sulfoxide (DMSO), dioxane, ethanol, ethyl acetate, ethylene glycol, glycerin, heptanes, Hexamethylphosphoramide (HMPA), Hexamethylphosphorous triamide (HMPT), hexane, methanol, methyl t-butyl ether (MTBE), methylene chloride, N-methyl-2-pyrrolidinone (NMP), nitromethane, pentane, Petroleum ether (ligroine), 1-propanol, 2-propanol, pyridine, tetrahydrofuran (THF), toluene, triethyl amine, o-xylene, m-xylene, p-xylene, or mixtures thereof.

In an embodiment, the oleaginous fluid may include aromatic petroleum cuts, terpenes, mono-, di- and tri-glycerides of saturated or unsaturated fatty acids including natural and synthetic triglycerides, aliphatic esters such as methyl esters of a mixture of acetic, succinic and glutaric acids, aliphatic ethers of glycols such as ethylene glycol monobutyl ether, minerals oils such as vaseline oil, chlorinated solvents like 1,1,1-trichloroethane, perchloroethylene and methylene chloride, deodorized kerosene, solvent naphtha, paraffins (including linear paraffins), isoparaffins, olefins (especially linear olefins) and aliphatic or aromatic hydrocarbons (such as toluene). Terpenes are suitable, including d-limonene, l-limonene, dipentene (also known as 1-methyl-4-(1-methylethenyl)-cyclohexene), myrcene, alpha-pinene, linalool and mixtures thereof.

Further oleaginous liquids include long chain alcohols (monoalcohols and glycols), esters, ketones (including diketones and polyketones), nitrites, amides, amines, cyclic ethers, linear and branched ethers, glycol ethers (such as ethylene glycol monobutyl ether), polyglycol ethers, pyrrolidones like N-(alkyl or cycloalkyl)-2-pyrrolidones, N-alkyl piperidones, N,N-dialkyl alkanolamides, N,N,N',N'-tetra alkyl ureas, dialkylsulfoxides, pyridines, hexaalkylphosphoric triamides, 1,3-dimethyl-2-imidazolidinone, nitroalkanes, nitro-compounds of aromatic hydrocarbons, sulfolanes, butyrolactones, and alkylene or alkyl carbonates. These include polyalkylene glycols, polyalkylene glycol ethers like mono (alkyl or aryl)ethers of glycols, mono (alkyl or aryl)ethers of polyalkylene glycols and poly (alkyl and/or aryl)ethers of polyalkylene glycols, monoalkanoate esters of glycols, monoalkanoate esters of polyalkylene glycols, polyalkylene glycol esters like poly (alkyl and/or aryl) esters of polyalkylene glycols, dialkyl ethers of polyalkylene glycols, dialkanoate esters of polyalkylene glycols, N-(alkyl or cycloalkyl)-2-pyrrolidones, pyridine and alkylpyridines, diethylether, dimethoxyethane, methyl formate, ethyl formate, methyl propionate, acetonitrile, benzonitrile, dimethylformamide, N-methylpyrrolidone, ethylene carbonate, dimethyl carbonate, propylene carbonate, diethyl carbonate, ethylmethyl carbonate, and dibutyl carbonate, lactones, nitromethane, and nitrobenzene sulfones. The oleaginous liquid may also include tetrahydrofuran, dioxane, dioxolane, methyltetrahydrofuran, dimethylsulfone, tetramethylene sulfone and thiophen.

In an embodiment, the well treatment fluid may be utilized in combination with a carrier fluid, which may include any gravel packing fluid, base fracturing fluid, or the like, as are understood by one of skill in the art. It is to be understood that the necessarily insoluble components of various carrier fluids including gravel, proppant, weighting agents, and the like, are not to be included in determining the amount of acid insoluble components present in the second fluid as described herein. Some non-limiting examples of carrier fluids include hydratable gels (e.g. guars, poly-saccharides, xanthan, hydroxyethyl-cellulose, etc.), a crosslinked hydratable gel, a viscosified acid (e.g. gel-based), an emulsified acid (e.g. oil outer phase), an energized fluid (e.g. an $N_2$ or $CO_2$ based foam), and an oil-based fluid including a gelled, foamed, or otherwise viscosified oil. Additionally, the carrier fluid may be a brine, and/or may include a brine. Accordingly, in an embodiment, at least 40 vol % of any non-proppant solids present in the second fluid are water-soluble at a pH of less than or equal to 6.5.

In certain embodiments, the carrier fluid includes an acid. The fracture may be a traditional hydraulic bi-wing fracture, but in certain embodiments may be an etched fracture and/or wormholes such as developed by an acid treatment. The carrier fluid may include hydrochloric acid, hydrofluoric acid, ammonium bifluoride, formic acid, acetic acid, lactic acid, glycolic acid, maleic acid, tartaric acid, sulfamic acid, malic acid, citric acid, methyl-sulfamic acid, chloro-acetic acid, an amino-poly-carboxylic acid, 3-hydroxypropionic acid, a poly-amino-poly-carboxylic acid, and/or a salt of any acid. In certain embodiments, the carrier fluid includes a poly-amino-poly-carboxylic acid, and is a trisodium hydroxyl-ethyl-ethylene-diamine triacetate, mono-ammonium salts of hydroxyl-ethyl-ethylene-diamine triacetate, and/or mono-sodium salts of hydroxyl-ethyl-ethylene-diamine tetra-acetate. The selection of any acid as a carrier fluid depends upon the purpose of the acid—for example formation etching, damage cleanup, removal of acid-reactive particles, etc., and further upon compatibility with the formation, compatibility with fluids in the formation, and compatibility with other components of the fracturing slurry and with spacer fluids or other fluids that may be present in the wellbore. The selection of an acid for the carrier fluid is understood in the art based upon the characteristics of particular embodiments and the disclosures herein.

The carrier fluid may include a particulate blend made of proppant. As stated elsewhere, it is to be understood that the necessarily insoluble components of the proppant are not included in determining the amount of acid insoluble components present in the second fluid as described herein. Proppant selection involves many compromises imposed by economic and practical considerations. Criteria for selecting the proppant type, size, size distribution in multimodal proppant selection, and concentration is based on the needed dimensionless conductivity, and can be selected by a skilled artisan. Such proppants can be natural or synthetic including but not limited to glass beads, ceramic beads, sand, and bauxite, coated, or contain chemicals; more than one can be used sequentially or in mixtures of different sizes or different materials. The proppant may be resin coated (curable), or pre-cured resin coated. Proppants and gravels in the same or different wells or treatments can be the same material and/or the same size as one another and the term proppant is intended to include gravel in this disclosure. In some embodiments, irregular shaped particles may be used such as unconventional proppant. In general the proppant used will have an average particle size of from about 0.15 mm to about 4.76 mm (about 100 to about 4 U.S. mesh), or from about 0.15 mm to about 3.36 mm (about 100 to about 6 U.S. mesh), more or from about 0.15 mm to about 4.76 mm (about 100 to about 4 U.S. mesh), more particularly, but not limited to 0.25 to 0.42 mm (40/60 mesh), 0.42 to 0.84 mm (20/40 mesh), 0.84 to 1.19 mm (16/20), 0.84 to 1.68 mm (12/20 mesh) and 0.84 to 2.38 mm (8/20 mesh) sized materials. Normally the proppant will be present in the slurry in a concentration from about 0.12 to about 0.96 kg/L, or from about 0.12 to about 0.72 kg/L, or from about 0.12 to about 0.54 kg/L. Also, they are slurry where the proppant is at a concentration up to 16 PPA (1.92 kg/L). If the slurry is foamed the proppant is at a concentration up to 20 PPA (2.4 kg/L).

The carrier fluid may further comprise a degradable material. In certain embodiments, the degradable material includes at least one of a lactide, a glycolide, an aliphatic polyester, a poly (lactide), a poly (glycolide), a poly (ε-caprolactone), a poly (orthoester), a poly (hydroxybutyrate), an aliphatic polycarbonate, a poly (phosphazene), and a poly (anhydride). In certain embodiments, the degradable material includes at least one of a poly (saccharide), dextran, cellulose, chitin, chitosan, a protein, a poly (amino acid), a poly (ethylene oxide), and a copolymer including poly (lactic acid) and poly (glycolic acid). In certain embodiments, the degradable material includes a copolymer including a first moiety which includes at least one functional group from a hydroxyl group, a carboxylic acid group, and a hydrocarboxylic acid group, the copolymer further including a second moiety comprising at least one of glycolic acid and lactic acid.

In some embodiments, the carrier fluid may optionally further comprise additional additives, including, but not limited to, acids, fluid loss control additives, gas, corrosion inhibitors, scale inhibitors, catalysts, clay control agents, biocides, friction reducers, combinations thereof and the like. For example, in some embodiments, it may be desired to foam the storable composition using a gas, such as air, nitrogen, or carbon dioxide.

The carrier fluids may be used for carrying out a variety of subterranean treatments, including, but not limited to, drilling operations, fracturing treatments, and completion operations (e.g., gravel packing). In some embodiments, the composition may be used in treating a portion of a subterranean formation. In certain embodiments, the composition may be introduced into a well bore that penetrates the subterranean formation as a treatment fluid. For example, the treatment fluid may be allowed to contact the subterranean formation for a period of time. In some embodiments, the treatment fluid may be allowed to contact hydrocarbons, formations fluids, and/or subsequently injected treatment fluids. After a chosen time, the treatment fluid may be recovered through the well bore. In certain embodiments, the treatment fluids may be used in fracturing treatments.

The method and fluids alone, or in combination with the carrier fluids may also be suitable for gravel packing, or for fracturing and gravel packing in one operation (called, for example frac and pack, frac-n-pack, frac-pack, STIMPAC (Trade Mark from Schlumberger) treatments, or other names), which are also used extensively to stimulate the production of hydrocarbons, water and other fluids from subterranean formations. These operations involve pumping the composition and propping agent/material in hydraulic fracturing or gravel (materials are generally as the proppants used in hydraulic fracturing) in gravel packing. In low permeability formations, the goal of hydraulic fracturing is generally to form long, high surface area fractures that greatly increase the magnitude of the pathway of fluid flow from the formation to the wellbore. In high permeability formations, the goal of a hydraulic fracturing treatment may be to create a short, wide, highly conductive fracture, in order to bypass near-wellbore damage done in drilling and/or completion, to ensure good fluid communication between the reservoir and the wellbore and also to increase the surface area available for fluids to flow into the wellbore.

In an embodiment, a wellbore may be gravelpacked or otherwise serviced with a proppant. In an embodiment, the displacement fluid and the gravel carrier fluid may have a density equivalent to or greater than the formation pore pressure to prevent a well control event. In an embodiment, when gravelpacking such a well/formation the original drilling fluid depositing the filtercake may be the acid soluble invert emulsion system, referred to herein as the second fluid since gravelpacking traps the filtercake in place and limits direct contact between filtercake and treatment fluids placed post gravelpack completion. Accordingly, fluid left inside the basepipe or other structure of the completion has very limited potential to contact the filtercake. Breakers for "high density, non-aqueous" mud systems are of limited benefit because most systems require barite to achieve the required density. Barite is not acid soluble and therefore even a follow up acid treatment will not remove these solids. In addition, the positive overbalance condition required when attempting to remove any filtercake may result in damage with conventional methods that results in losses that drive the undissolved solids further into the formation, thus exacerbating the damage. Since the system according to the instant disclosure comprises the breaker as a functional part of the filtercake or the displacement fluid, the triggering mechanism is the presence of acid gases ($H_2S$, $CO_2$, and/or the like) in the formation fluid. Both these gasses have a high rate of diffusion and will partition into the filtercake and displacement fluid rapidly over some period of time. The chemistry of these gases in contact with the filtercake produced by the second fluid and/or the reversible displacement fluid according to the present disclosure, results in the emulsion/wetting chemistry to switch, rendering the filtercake dispersible into the third produced fluid and any un-produced solids to water wet, for future potential traditional acid treatment, removal, and/or the like.

EMBODIMENT LISTING

The instant disclosure provides the following embodiments:

A. A method comprising displacing a first oil-based fluid present in an open hole interval of a wellbore with a second fluid; and contacting the second fluid with an acidic indigenous formation fluid for a period of time sufficient to produce a third fluid from at least a portion of the second fluid, wherein the second fluid comprises a reversible invert emulsion comprising an aqueous fluid dispersed as a discontinuous phase within an oleaginous fluid, and an amine surfactant, wherein the amine surfactant is selected such that contacting the second fluid with the acidic indigenous formation fluid for the sufficient period of time protonates at least a portion of the amine surfactant in the second fluid to produce the third fluid comprising an emulsion comprising the oleaginous fluid reversibly dispersed as a discontinuous phase within the aqueous fluid, wherein at least 40 vol % of any non-proppant solids present in the second fluid are water-soluble at a pH of less than or equal to 6.5.

B. The method according to Embodiment A, further comprising circulating the first oil-based fluid for a period of time sufficient to remove at least a portion of any drilling debris present in the wellbore prior to displacing the first oil based fluid.

C. The method according to Embodiment A or B, wherein the open hole interval of the wellbore is located below an upper cased hole interval of the wellbore, an upper open hole interval of the wellbore, or a combination thereof.

D. The method according to Embodiment A, B, or C, further comprising positioning a completion assembly into the open hole interval in the presence of the first fluid, the second fluid, or the third fluid.

E. The method according to Embodiment A, B, C or D, further comprising displacing the third fluid with a completion fluid.

F. The method according to Embodiment A, B, C, D, or E, further comprising displacing an oil based fluid located above the open hole interval of the wellbore with a completion fluid.

G. The method according to Embodiment A, B, C, D, E, or F, wherein the first fluid comprises an oleaginous fluid which is the same as the oleaginous fluid present in the second fluid.

H. The method according to Embodiment A, B, C, D, E, F, or G, wherein the sufficient period of time of contact between the second fluid and the indigenous formation fluid required to protonate at least a portion of the amine surfactant in the second fluid to produce the third fluid from at least a portion of the second fluid is at least 24 hours.

I. The method according to Embodiment A, B, C, D, E, F, G, or H, wherein the indigenous formation fluid comprises dissolved carbon dioxide, hydrogen sulfide, or a combination thereof J. The method according to Embodiment A, B, C, D, E, F, G, H, or I, wherein the amine surfactant has the structure:

wherein $R^1$ is a $C_8$-$C_{24}$ hydrocarbyl;

wherein $R^2$ and $R^3$ are independently selected from $C_2$-$C_{10}$ substituted or unsubstituted hydrocarbyl, ethylene oxide, propylene oxide, or a combination thereof; and wherein a+b is greater than or equal to 2.

K. The method according to Embodiment A, B, C, D, E, F, G, H, I, or J, wherein the second fluid has a density of greater than or equal to about 13.5 lbs/gal.

L. The method according to Embodiment A, B, C, D, E, F, G, H, I, J, or K, wherein a viscosity of the second fluid is higher than a viscosity of the third fluid.

M. The method according to Embodiment A, B, C, D, E, F, G, H, I, J, K, or L, wherein the second fluid comprises from about 30% to about 70% by volume of the oleaginous fluid.

N. The method according to Embodiment A, B, C, D, E, F, G, H, I, J, K, L, or M, wherein the oleaginous fluid is selected from a group consisting of diesel oil, mineral oil, a synthetic oil, and combinations thereof

O. The method according to Embodiment A, B, C, D, E, F, G, H, I, J, K, L, M, or N, wherein the second fluid comprises from about 30% to about 70% of the aqueous fluid.

P. The method according to Embodiment A, B, C, D, E, F, G, H, I, J, K, L, M, N, or O, wherein the aqueous fluid is water, sea water, a brine comprising organic or inorganic dissolved salts, or a combination thereof Q. The method according to Embodiment A, B, C, D, E, F, G, H, I, J, K, L, M, N, O, or P, wherein the amine surfactant is diethoxylated tallow amine; diethoxylated soya amine; an N-alkyl-1,3-diaminopropane, wherein the alkyl is a $C_{12}$ to $C_{22}$ hydrocarbon; or a combination thereof.

R. A system for treating a subterranean well comprising:
a first acid soluble invert emulsion fluid comprising a reversible invert emulsion comprising an aqueous fluid dispersed as a discontinuous phase within an oleaginous fluid, and an amine surfactant, wherein the amine surfactant is selected such that contacting the first acid soluble invert emulsion fluid with an acidic indigenous formation fluid for a sufficient period of time protonates at least a portion of the amine surfactant in the first acid soluble invert emulsion fluid to produce a second oil in water emulsion fluid comprising an emulsion comprising the oleaginous fluid dispersed as a discontinuous phase within the aqueous fluid, wherein at least 40 vol % of any non-proppant solids present in the first fluid are water-soluble at a pH of less than or equal to 6.5.

S. The system for treating a subterranean well of Embodiment R, wherein the amine surfactant has the structure:

wherein $R^1$ is a $C_8$-$C_{24}$ hydrocarbyl;

wherein $R^2$ and $R^3$ are independently selected from $C_2$-$C_{10}$ substituted or unsubstituted hydrocarbyl, ethylene oxide, propylene oxide, or a combination thereof; and wherein a+b is greater than or equal to 2.

T. A system for treating a subterranean well comprising the second fluid according to any one of Embodiments A-Q.

U. A fluid comprising:

a reversible invert emulsion comprising an aqueous fluid dispersed as a discontinuous phase within an oleaginous fluid, and an amine surfactant, wherein the amine surfactant is selected such that contacting the fluid with an acidic indigenous formation fluid for a sufficient period of time protonates at least a portion of the amine surfactant in the fluid to produce a second fluid comprising an emulsion comprising the oleaginous fluid dispersed as a discontinuous phase within the aqueous fluid, wherein at least 40 vol % of any non-proppant solids present in the fluid are water-soluble at a pH of less than or equal to 6.5, wherein the amine surfactant has the structure:

wherein $R^1$ is a $C_8$-$C_{24}$ hydrocarbyl;

wherein $R^2$ and $R^3$ are independently selected from $C_2$-$C_{10}$ substituted or unsubstituted hydrocarbyl, ethylene oxide, propylene oxide, or a combination thereof; and wherein a+b is greater than or equal to 2.

V. A fluid comprising the second fluid according to any one of Embodiments A-Q.

EXAMPLES

Fluid formulations according to the instant disclosure are provided as a demonstration of a reversible high density fluid adequate which inverts upon exposure of the fluid or filtercake to subterranean formations containing amounts of acid gasses ($CO_2$ and $H_2S$) that are contained within the formation fluids. In the embodiment shown, the fluids are formulated with very low oil to water ratios and high density brine internal phases in order to minimize the amount of non-acid soluble solids, which act as weighting agents in the fluid. The inventive formulations provided have oil to water ratios of 35:65.

Example Formulation #1 utilizes API grade barite and represents a reversible system with a minimal amount of acid soluble solids.

Example Formulation #2 represents a similarly reversible formulation to Example Formulation 1, but with a higher amount of acid soluble solids.

Example Formulation #1

| Material Description | SG | Conc. | Units | Function |
|---|---|---|---|---|
| Base Oil | 0.814 | 0.220 | bbl | carrier |
| FAZEMUL | 0.911 | 13.0 | lbm/bbl | emulsifier/wetting agent |
| NOVATEC F | 1.02 | 0.5 | lbm/bbl | filtration control agent/wetting agent |
| VERSAGEL HT | 1.7 | 2.0 | lbm/bbl | viscosifier/gellant |
| Lime* | 2.3 | 5.0 | lbm/bbl | alkalinity buffer* |
| water | 1.0 | 0.129 | bbl | internal phase |
| **Barite | 4.2 | 352.95 | lbm/bbl | solid weighting agent~ |
| ECF 2560 | | 4.0 | lbm/bbl | secondary wetting agent |
| $CaCl_2$ liquor | 1.39 | 0.338 | bbl | internal phase: water activity & density agent |

Notes:
*Concentration may be adjusted as required to achieve the desired control and delay of emulsion inversion.
**Concentration may be adjusted to achieve the required fluid density.

Example Formulation #2

| Material Description | SG | Conc. | Units | Function |
|---|---|---|---|---|
| Base Oil | 0.814 | 0.130 | bbl | carrier |
| FAZEMUL | 0.911 | 13.0 | lbm/bbl | emulsifier/wetting agent |
| NOVATEC F | 1.02 | 0.5 | lbm/bbl | filtration control agent/wetting agent |
| VERSAGEL HT | 1.7 | 1.5 | lbm/bbl | viscosifier/gellant |
| Lime* | 2.3 | 5.0 | lbm/bbl | alkalinity buffer* |
| water | 1.0 | 0.016 | bbl | internal phase |
| **$CaCO_3$ | 2.7 | 304.96 | lbm/bbl | solid weighting agent~ |
| ECF 2560 | | 6.0 | lbm/bbl | secondary emulsifier |
| $CaBr_2$ liquor | 1.70 | 0.338 | bbl | internal phase: water activity & density agent |

Notes:
*Concentration may be adjusted as required to achieve desired control and delay of wettability.
**Concentration may be adjusted to achieve the required fluid density.

The materials used in Formulation #1 and Formulation #2 are as follows:

| | |
|---|---|
| Base Oil | Diesel |
| FAZEMUL ® | (MI-Swaco, Houston, Tx) ethoxylated fatty amine surfactants and polyethylene glycol (emulsifier) |
| NOVATEC F ® | (Schlumberger, Houston, TX) maleated rosin acids and dipropylene monomethyl ether (filtration control agent & secondary wetting agent for temperatures above 100° C.) |
| VERSAGEL HT ® | (Schlumberger, Houston, TX) organophilic hectorite clay (viscosifier & gellant) |
| Lime | Hydrated lime (alkalinity control agent) |
| Water | Fresh |
| Barite | Barium sulfate |
| $CaCO_3$ | Ground & sized calcium carbonate |
| ECF 2560 ® | (Schlumberger, Houston, TX) Secondary emulsifier |
| $CaBr_2$ Liquor | Concentrated calcium bromide brine |

Although only a few example embodiments have been described in detail above, those skilled in the art will readily appreciate that many modifications are possible in the example embodiments without materially departing from this invention. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A method comprising
    displacing a first oil-based fluid present in an open hole interval of a wellbore with a second fluid; and
    contacting the second fluid with an acidic indigenous formation fluid for a period of time sufficient to produce a third fluid from at least a portion of the second fluid,
    wherein the second fluid comprises a reversible invert emulsion comprising an aqueous fluid dispersed as a discontinuous phase within an oleaginous fluid, and an amine surfactant, wherein the amine surfactant is selected such that contacting the second fluid with the acidic indigenous formation fluid for the sufficient period of time protonates at least a portion of the amine surfactant in the second fluid to produce the third fluid comprising an emulsion comprising the oleaginous fluid dispersed as a discontinuous phase within the aqueous fluid, wherein at least 40 vol % of any non-proppant solids present in the second fluid are water-soluble at a pH of less than or equal to 6.5.

2. The method of claim 1, further comprising circulating the first oil-based fluid for a period of time sufficient to remove at least a portion of any drilling debris, filtercake, or a combination thereof present in the wellbore prior to displacing the first oil based fluid.

3. The method of claim 1, wherein the open hole interval of the wellbore is located below an upper cased hole interval of the wellbore.

4. The method of claim 1, further comprising positioning a completion assembly into the open hole interval in the presence of the first fluid, the second fluid, or the third fluid.

5. The method of claim 4, further comprising displacing the third fluid with a completion fluid.

6. The method of claim 4, further comprising displacing an oil based fluid located above the open hole interval of the wellbore with a completion fluid.

7. The method of claim 1, wherein the first fluid comprises an oleaginous fluid which is the same as the oleaginous fluid present in the second fluid.

8. The method of claim 1, wherein the sufficient period of time of contact between the second fluid and the indigenous formation fluid required to protonate at least a portion of the amine surfactant in the second fluid to produce the third fluid from at least a portion of the second fluid is at least 24 hours.

9. The method of claim 1, wherein the indigenous formation fluid comprises dissolved carbon dioxide, hydrogen sulfide, or a combination thereof.

10. The method of claim 1, wherein the amine surfactant has the structure:

wherein $R^1$ is a $C_8$-$C_{24}$ hydrocarbyl;
wherein $R^2$ and $R^3$ are independently selected from $C_2$-$C_{10}$ substituted or unsubstituted hydrocarbyl, ethylene oxide, propylene oxide, or a combination thereof; and
wherein a+b is greater than or equal to 2.

11. The method of claim 1, wherein the second fluid has a density of greater than or equal to about 13.5 lbs/gal.

12. The method of claim 1 wherein a viscosity of the second fluid is higher than a viscosity of the third fluid.

13. The method of claim 1, wherein the second fluid comprises from about 30% to about 70% by volume of the oleaginous fluid.

14. The method of claim 1, wherein the oleaginous fluid is selected from a group consisting of diesel oil, mineral oil, a synthetic oil, and combinations thereof.

15. The method of claim 1, wherein the second fluid comprises from about 30% to about 70% of the aqueous fluid.

16. The method of claim 1, wherein the aqueous fluid is water, sea water, a brine comprising organic or inorganic dissolved salts, or a combination thereof.

17. The method of claim 1 wherein the amine surfactant is diethoxylated tallow amine; diethoxylated soya amine; an N-alkyl-1,3-diaminopropane, wherein the alkyl is a $C_{12}$ to $C_{22}$ hydrocarbon; or a combination thereof, comprising from 2 to 30 moles of ethylene oxide.

* * * * *